(12) United States Patent
Govindankutty et al.

(10) Patent No.: US 10,827,034 B2
(45) Date of Patent: Nov. 3, 2020

(54) PROVIDING APPLICATION VERSIONS VIA DELTA VOLUMES

(71) Applicant: VMWARE, INC., Palo Alto, CA (US)

(72) Inventors: Sivaprasad Kundoor Govindankutty, Bengaluru (IN); Smitha Radhakrishnan, Bengaluru (IN); Jubish Kulathumkal Jose, Bengaluru (IN); Noble Peter Aranjani, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 288 days.

(21) Appl. No.: 15/700,078

(22) Filed: Sep. 9, 2017

(65) Prior Publication Data
US 2019/0020731 A1 Jan. 17, 2019

(30) Foreign Application Priority Data
Jul. 14, 2017 (IN) .............................. 201741025105

(51) Int. Cl.
| | |
|---|---|
| G06F 15/167 | (2006.01) |
| H04L 29/08 | (2006.01) |
| G06F 8/71 | (2018.01) |
| G06F 9/455 | (2018.01) |
| G06F 16/27 | (2019.01) |
| G06F 8/65 | (2018.01) |
| G06F 16/11 | (2019.01) |
| G06F 16/18 | (2019.01) |

(52) U.S. Cl.
CPC ............... *H04L 67/34* (2013.01); *G06F 8/65* (2013.01); *G06F 8/71* (2013.01); *G06F 9/45558* (2013.01); *G06F 16/27* (2019.01); *H04L 67/10* (2013.01); *H04L 67/1097* (2013.01); *G06F 16/128* (2019.01); *G06F 16/1873* (2019.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,284,244 B1 * | 10/2007 | Sankaranarayan | ... G06F 9/5027 718/103 |
| 2012/0297181 A1 * | 11/2012 | Lee | ........................ G06F 9/4401 713/2 |
| 2013/0219030 A1 * | 8/2013 | Szabo | ..................... H04L 49/70 709/221 |
| 2013/0291021 A1 * | 10/2013 | Kim | ..................... H04N 21/235 725/54 |

(Continued)

*Primary Examiner* — Phuoc H Nguyen

(57) ABSTRACT

Described herein are systems, methods, and software to enhance the management of different versions of an application for a computing environment. In one implementation, a computing environment may identify a request to update an application from a first version to a second version on a virtual machine. In response to the request, one or more storage volumes may be identified that are associated with the second version of the application, wherein the one or more additional storage volumes comprise one or more delta volumes Once the one or more storage volumes are identified, the computing environment may attach the one or more storage volumes to the virtual machine to make the second version of the application executable on the virtual machine.

20 Claims, 10 Drawing Sheets

(56) References Cited

U.S. PATENT DOCUMENTS

| | | | | |
|---|---|---|---|---|
| 2014/0282472 A1* | 9/2014 | Vinograd | .................. | G06F 8/63 |
| | | | | 717/170 |
| 2017/0235563 A1* | 8/2017 | Bafna | ....................... | G06F 8/65 |
| | | | | 718/1 |
| 2017/0364353 A1* | 12/2017 | Adler | ........................ | G06F 8/70 |
| 2018/0121189 A1* | 5/2018 | Philippov | ................. | G06F 8/65 |
| 2018/0203715 A1* | 7/2018 | Granado | ................. | G06F 8/656 |
| 2018/0302495 A1* | 10/2018 | Lee | ......................... | H04L 67/34 |

* cited by examiner

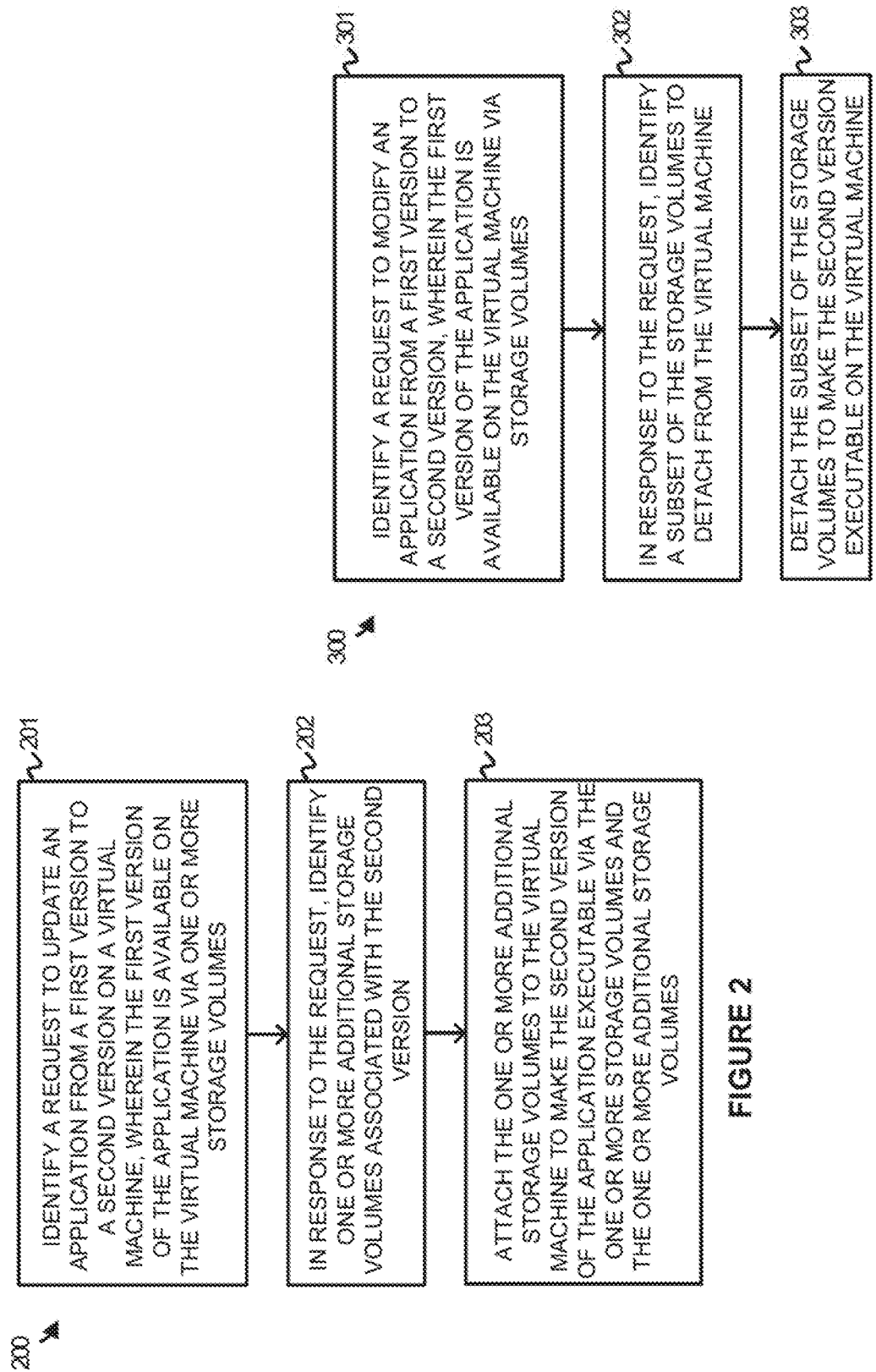

| APPLICATIONS 712 | USER 710 | USER 711 | USER 712 |
|---|---|---|---|
| APPLICATION 720 | VERSION A | VERSION A | VERSION B |
| APPLICATION 721 | VERSION A | VERSION B | VERSION C |
| APPLICATION 722 | | | VERSION A |
| APPLICATION 723 | | VERSION B | VERSION B |

DATA STRUCTURE 700

FIGURE 7

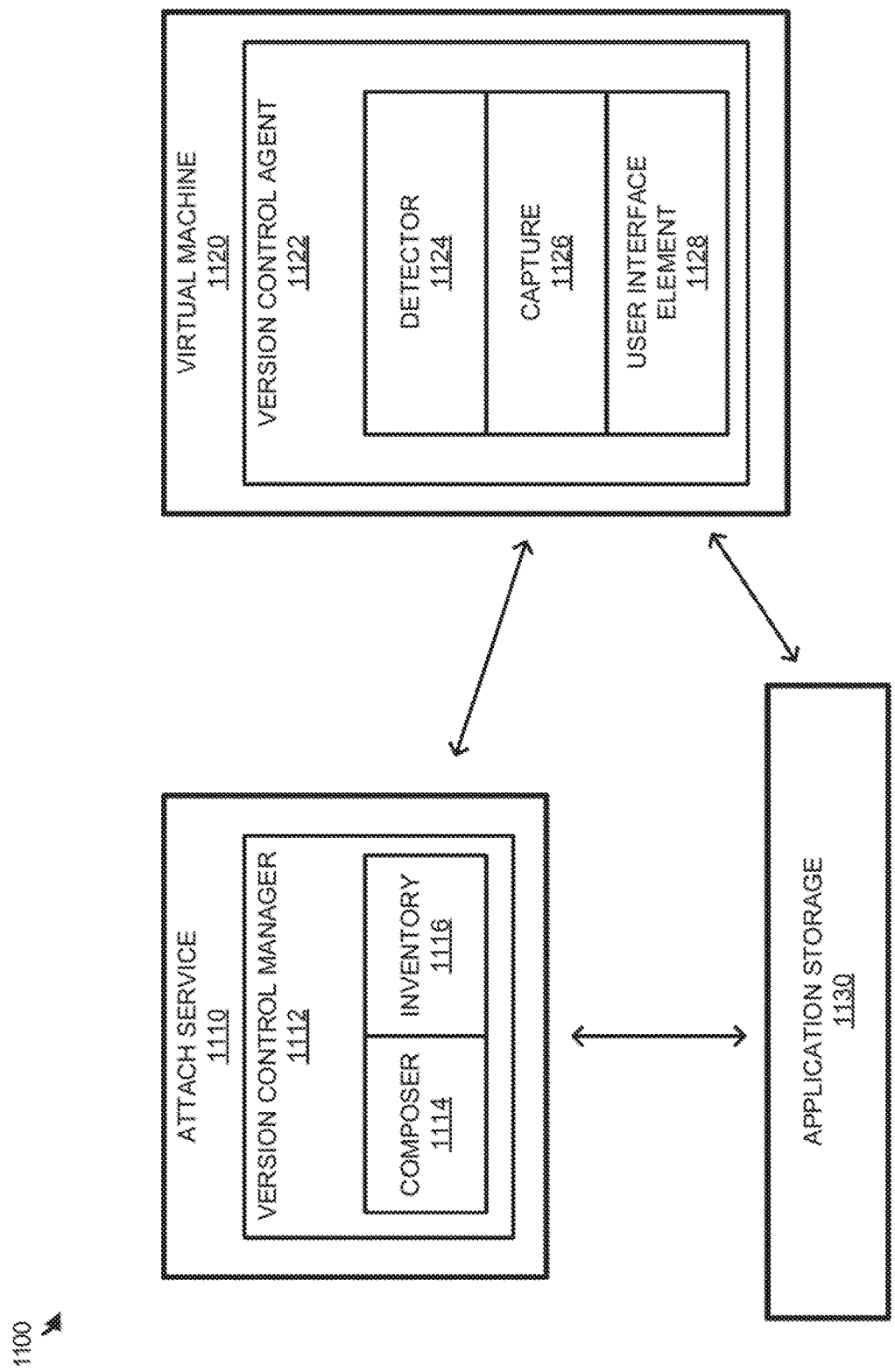

PROVIDING APPLICATION VERSIONS VIA DELTA VOLUMES

RELATED APPLICATIONS

Benefit is claimed under 35 U.S.C. 119(a)-(d) to Foreign Application Serial No. 201741025105 filed in India entitled "PROVIDING APPLICATION VERSIONS VIA DELTA VOLUMES", on Jul. 14, 2017, by VMware, Inc., which is herein incorporated in its entirety by reference for all purposes

BACKGROUND

In virtual desktop environments, host computers may execute a plurality of virtual machines that can be accessed as a service by end users for traditional desktop computing tasks. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To provide the required applications, the service may identify applications required for a user, and mount or attach application volumes to the virtual machine allocated to the user to make the applications executable from the storage volumes. An application volume may be considered a containerized, or virtualized, application stored in a virtual disk. When the virtual disk is attached to the virtual machine, an agent running on the virtual machine overlays the containerized application on the native file structure so that the containerized application appears to be natively installed onto the disk of the virtual machine. In some implementations, this attachment process may modify any required registry information of the virtual machine to make the applications executable from the application volumes.

Once the application volumes are attached, the user may execute the applications located in the attached volumes as if the applications were locally installed on the virtual machine. However, although attaching application volumes to make applications executable may increase efficiency in making applications available to multiple users, it can often be difficult and cumbersome to administrators of the computing environment to manage different versions of the same application. In particular, different versions of the same application may require separate application volumes or may be required to be stored on a user specific volume, which can use unnecessary amounts of data storage.

Overview

The technology disclosed herein enhances the management of application versions available in a virtual computing environment. In one implementation, a method of updating an application on a virtual machine includes identifying a request to update an application from a first version to a second version, wherein the first version of the application is executable on the virtual machine via one or more storage volumes attached to the virtual machine. The method further includes, in response to the request, identifying one or more additional storage volumes associated with the second version of the application, wherein the one or more additional storage volumes comprise one or more delta volumes for the second version of the application over the first version of the application. The method also provides attaching the one or more additional storage volumes to the virtual machine to make the second version of the application executable on the virtual machine via the one or more storage volumes and the one or more additional storage volumes.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates a method of attaching delta volumes to a virtual machine to update an application according to an implementation.

FIG. 3 illustrates a method of downgrading an application by detaching delta volumes according to an implementation.

FIG. 7 illustrates a data structure for managing application versions according to an implementation.

FIG. 11 illustrates an architecture of a virtual environment according to an implementation.

DETAILED DESCRIPTION

Figure 1:
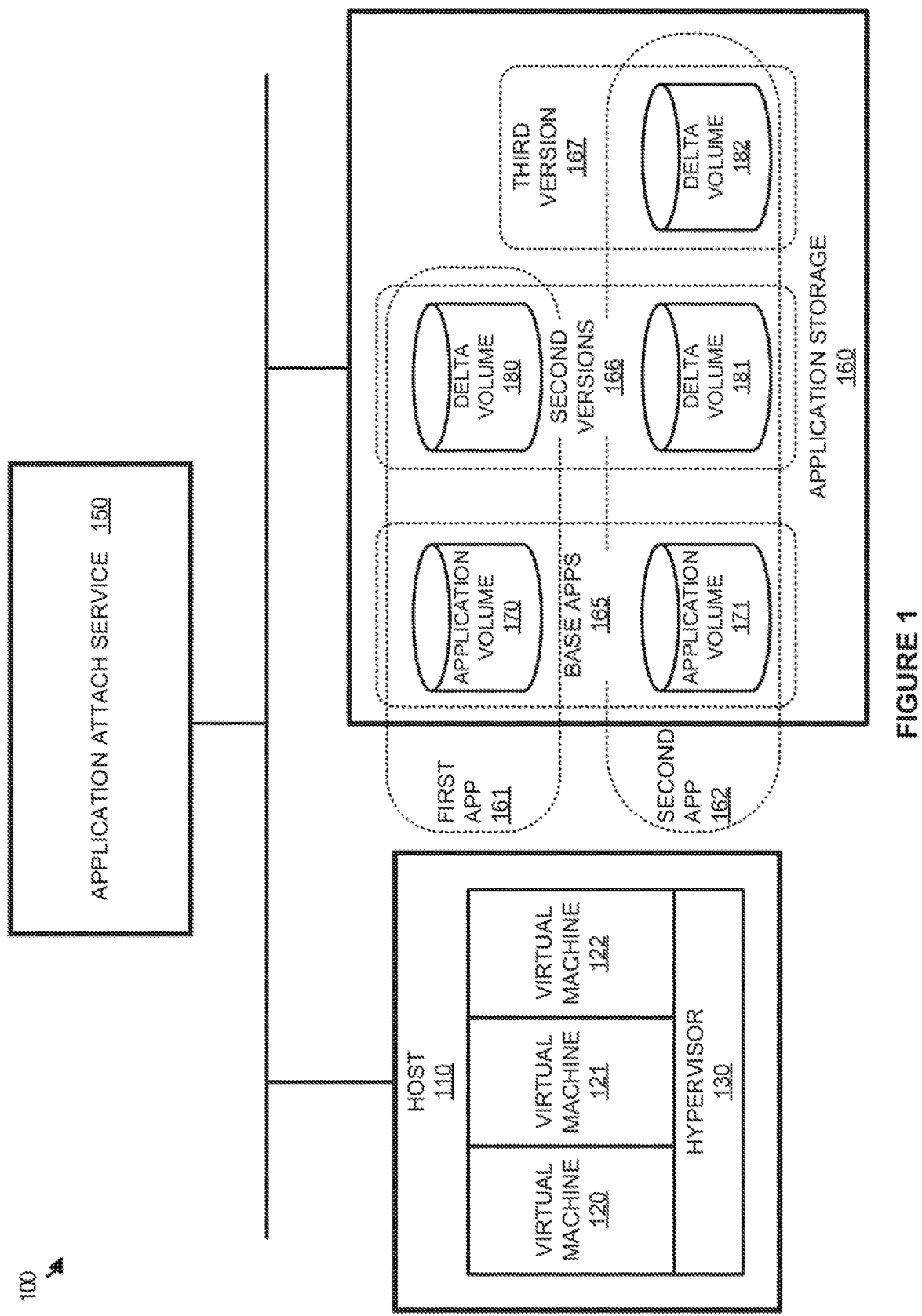
FIG. 1 illustrates a computing environment for attaching different application versions to virtual machines according to an implementation.

The various examples disclosed herein provide enhancements for application management for a virtual computing environment. In many situations, virtual machines provide a centralized computing platform for one or more end users to access and execute desired applications and operations. To provide each of the end users with the required applications, and prevent access to unnecessary applications, one or more application volumes are made available in the virtual environment that are capable of being attached to the individual virtual machines. These application volumes may include, but are not limited to, virtual machine disks (VMDKs), virtual hard disks (VHDs), or some other virtual disk file capable of storing applications for execution on the virtual machines.

To make the applications available to each individual user, an application attach service may be employed that acts as a volume manager that initiates the attachment of application volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes. Although this is one example of when storage volumes may be attached to a virtual machine, it should be understood that volumes may be attached by other mechanisms. For example, an agent executing inside the virtual machine may request the application service to attach one or more applications via attachable storage volumes.

To attach the storage volumes to the virtual machine, the virtual computing service may initiate a process to mount or map the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. Once mounted, the contents of the volume may be overlaid within the file structure of the virtual machine to make the applications executable. This overlaying may include modifying registry keys to make the application executable from the attached volume, as well as modifying the file structure to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application volumes. These installation processes may extract the necessary files and registry keys from an installer, and store the files and registry key files to an appropriate application storage volume. In some examples, the administrator may define application stacks, or groups of applications that are capable of assignment, and provide these groups of applications in one or more application volumes. For example, a first application group may include productivity applications to be supplied to a first set of end users, and a second application group may include video and image editing software to be provided to a second set of end users. Once the applications are stored within the application volumes, the administrator may define which of the applications or volumes are associated with requesting end users.

Here, to ensure that users are capable of using multiple versions of an application, the virtual computing environment may support the use of delta volumes to store differencing data between versions of an application. In particular, a first version of an application may be installed (by an administrator or user of the computing environment) with its required files and directories within a first storage volume. Once a second version of an application is requested, either by a user of a virtual machine or an administrator of the computing environment, a second volume may be generated that stores the differencing data between the first version of the application and the second version of the application. This differencing data may indicate new or deleted files from the first version of the application, modifications to directories or files from the first version of the application, or any other similar differencing data to support the second version of the application. In generating this second volume, the data for the update may be downloaded and extracted, and any differencing data between the versions of the application may be stored in the second volume (delta volume).

Once the new volume is created, any user capable of accessing the application may use both versions of the application. In particular, if a first user generates a new volume with the differencing data for an updated version of an application, a second user also with access to the application may be capable of requesting the updated version of the application. Once requested, rather than re-downloading and reinstalling the updated portions of the application, the new volume may be attached to the second user's virtual machine making the updated version of the application available to the second user. Thus, initially the second user maybe provided with a base volume or volumes that provides a first version of the application, and subsequently based on an update request, may be provided with the new volume to support the updated version of the application.

In some implementations, to provide the updated version of the application, the virtual machine may be configured to prioritize the data in the delta volume over the data in the first storage volume. As a result of this configuration, any updates stored in the delta volume, such as new files, or modifications to files of the first volume may be prioritized over other files and other data within the first volume.

FIG. 1 illustrates a computing environment 100 for attaching different application versions to virtual machines according to an implementation. Computing environment 100 includes host 110, application attach service 150, and application storage 160. Host 110 further includes virtual machines 120-122 and hypervisor 130. Application storage 160 further includes application volumes 170-171 and delta volumes 180-182.

In operation, hypervisor 130 executes on host 110 to provide a platform for virtual machines 120-122. In providing the platform, hypervisor may abstract the physical components of host 110 and provide virtual components to virtual machines 120-122, such as virtual processing systems, storage systems, network interfaces, and the like. In some implementations, to access the virtual machines, end users may, via remote devices, such as desktop computing systems, laptop computing systems, tablets, smartphones, and the like, provide login credentials to application attach service 150. Once the credentials are provided, application attach service 150 may identify a virtual machine for the end user and initiate a login process for the user to the virtual machine. This login process may include providing an access path (internet protocol address, uniform resource identifier, and the like) and credentials to the end user device to remotely access the allocated virtual machine.

In addition to providing the user with a base virtual machine, application attach service 150 may further be responsible for identifying and attaching application volumes to the virtual machines to make applications available for execution on the virtual machine. For example, when a user requests a virtual machine, application attach service 150 may identify applications associated with the end user and initiate an attach process of required application volumes to the allocated virtual machine. This attach process may include mounting the associated volumes and overlaying contents or data of the volumes in a file structure of the virtual machine to make the application executable from the application volume on the virtual machine.

In the present implementation, the applications available for the attachment include multiple versions, including base applications 165, second versions 166, and third version 167. In particular, first application (app) 161 includes a base version provided by application volume 170, and a second version provided by the combination of application volume 170 and delta volume 180. Additionally, second application 162 includes a base version of the application provided by application volume 171, a second version of the application provided by the combination of application volume 171 and delta volume 181, and a third version of the application provided by the combination of application volume 171, delta volumes 181-182. To provide a particular version of an application, such as the second version of first application 161, application attach service 150 may attach both application volumes 170 and delta volume 180. Specifically, the volumes may be mounted and the contents overlaid within the file structure to make the second version of the application executable from the mounted volumes. In some implementations, this overlaying may include prioritizing the delta volume over the base application volume, such that files and other data in the delta volume are used over any conflicting data in application volume 170.

FIG. 2 illustrates a method 200 of attaching delta volumes to a virtual machine to update an application according to an implementation. The operations of method 200 are described parenthetically in the paragraphs that follow with reference to the systems and elements of computing environment 100 of FIG. 1.

As depicted, method 200 includes identifying (201) a request to update an application from a first version to a second version, wherein the first version of the application is available on the virtual machine via one or more attached application volumes. For example, virtual machine 120 may have application volume 170 to provide a first version of the application to a user of virtual machine 120. Once application volume 170 is attached, a user or some automated process on the virtual machine may request an updated version of the application. In some implementations, the user may be presented with a graphical interface providing the user with a selectable option to upgrade the application to a second version, wherein the user may select the upgrade option to initiate the update process.

In response to identifying the request for the second version of the application, method 200 further includes identifying (202) one or more additional storage volumes associated with the second version of the application, wherein the one or more additional storage volumes comprise delta storage volumes. In some implementations, once a request is identified for the virtual machine, a notification may be provided to application attach service 150 from the virtual machine, wherein application attach service 150 may identify one or more additional volumes to support the update request. Returning to the example of virtual machine 120 with first application 161 using a base version of the application via application volume 170. When a request is identified to update the application to a second version, application attach service 150 will identify delta volume 180 to support the updated application. After identifying the required volume or volumes, method 200 further includes attaching (203) the one or more additional storage volumes to the virtual machine to make the second version of the application executable via the one or more storage volumes and the one or more delta storage volumes. In some implementations, this attaching may include using application attach service 150 to direct the hypervisor to attach any required delta volumes and overlaying the content of the delta volumes in the file structure of the virtual machine such that the delta volumes are of higher priority than the base application volume.

Again, referring to the example with first application 161, when delta volume 180 is mounted to virtual machine 120, the data within delta volume 180 may be overlaid in the file structure of virtual machine 120 such that the data of delta volume 180 is prioritized over the conflicting data in application volume 170.

FIG. 3 illustrates a method 300 of downgrading an application by detaching delta volumes according to an implementation. The operations of method 300 are referenced parenthetically in the paragraphs that follow with reference to systems of computing environment 100 of FIG. 1.

As depicted in FIG. 3, method 300 includes identifying (301) a request to downgrade an application on a virtual machine from a first version to a second version, wherein the first version is available on the virtual machine via attached storage volumes. In response to identifying the request, the method further includes identifying (302) a subset of the storage volumes to detach from the virtual machine to support the request, and detaching (303) the subset of the storage volumes to make the second version of the application executable on the virtual machine. In some implementations, this detaching may include unmounting the subset of volumes such that the data of the volumes is no longer overlaid in the file structure of the virtual machine.

As an example, from computing environment 100, virtual machine 120 may first be allocated second application 162 as its third version. Within the virtual machine, a user of virtual machine 120 may be provided with an interface that permits the user to select various versions of the application that are available via attachable volumes. Accordingly, if the user were to select a base version of the application, represented by the data in application volume 171, a process may be initiated wherein delta volumes 181-182 would be detached from virtual machine 120, making the contents of the volumes unavailable to the virtual machine, and permitting the first version or base version of the application to be used by the user. This process may include notifying application attach service 150 of the downgrade request, wherein application attach service 150 may identify the required volumes for detachment and direct hypervisor 130 to detach the volumes.

In some implementations, once a user selects a version of an application, a notification may be communicated to application attach service 150, wherein application attach service 150 may store a profile for the user. This profile may include information about the applications or application volumes associated with a user, as well as information about the version of the application preferred by the user. As a result, if the user of virtual machine 120 were to end the session, and request another session, application attach service 150 may be used to identify the required version for the user and attach the required volumes associated with the version of the application.

Figure 4:
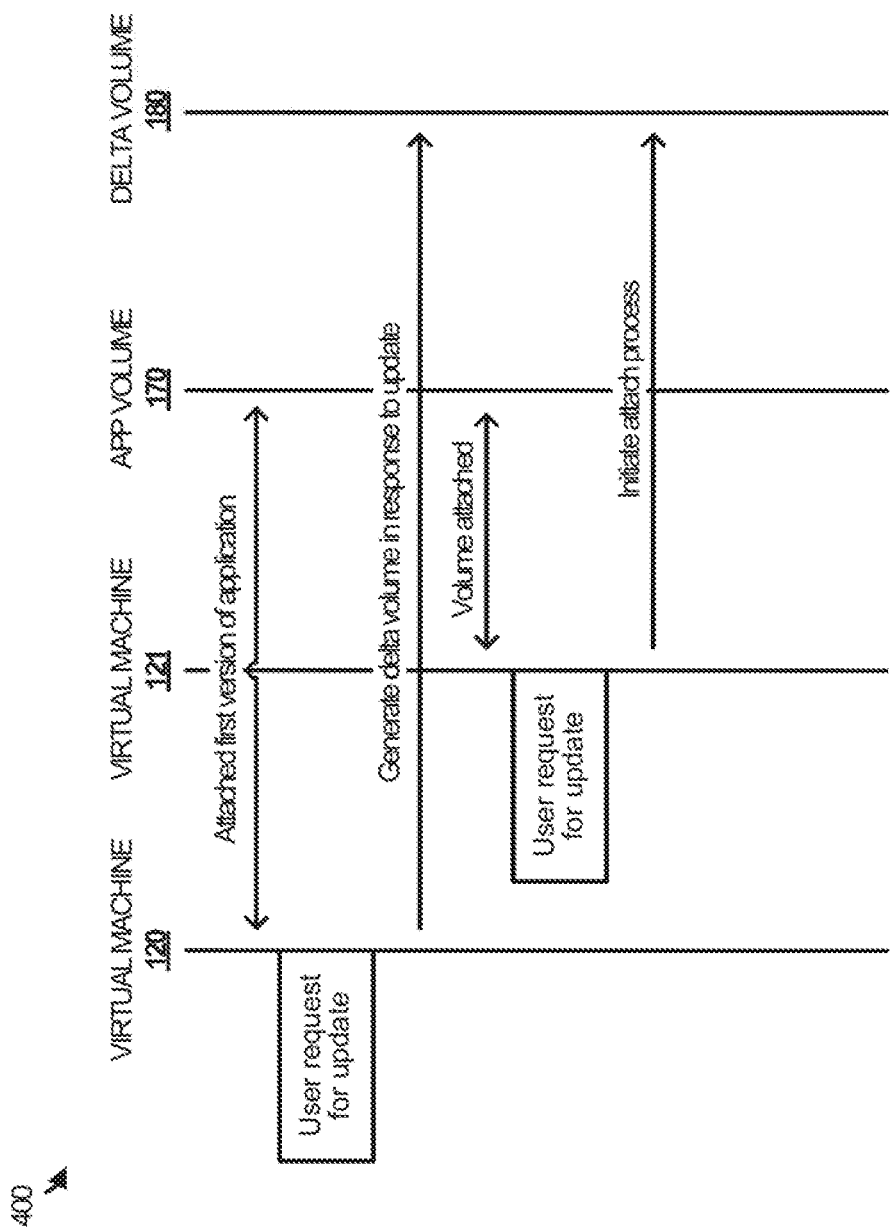
FIG. 4 illustrates a timing diagram for generating a delta volume for an application according to an implementation.

FIG. 4 illustrates a timing diagram 400 for generating a delta volume for an application according to an implementation. Timing diagram 400 includes virtual machines 120-

121, application volume 170, and delta volume 180 from computing environment 100 of FIG. 1.

As depicted, virtual machine 120 is first provided with a first version of first application 161 via attached application volume 170. In attaching application volume 170, application volume 170 may be mounted to the virtual machine and the contents overlaid in the virtual machine to make the application executable from the volume without performing a local installation of the application on the virtual machine. While the application is attached, a user of virtual machine 120 may request an update of the application from the first version to a second version. In response to the request, a determination may be made as to whether a delta volume is available to support the request. For example, a notification of the request may be transferred to application attach service 150, wherein the service may determine whether a volume or volumes is available to support the request. If available, an attach operation may be initiated to attach the one or more identified volumes. If, however, volumes are not available to support the request, then a new delta volume may be generated to support the request for the update.

Once it is determined that a delta volume is required, either locally at virtual machine 120 or at the application attach service, delta volume 180 is generated, wherein delta volume 180 stores differencing data for the second version of the application over the first version of the application. In some implementations, the update for the second version of the application may be downloaded from the internet, or retrieved from some other media, and instead of being installed in application volume 170, which could overwrite data in application volume 170, differencing data may be identified between the versions of the application, and the differencing data may be stored in delta volume 180. For example, if a new file were identified in the update version of the application, the new file may be stored in delta volume 180. Moreover, any modifications to a file or directory may be reflected in delta volume 180. Once delta volume 180 is generated, the user of virtual machine 120 may execute the updated version of the application using the contents of delta volume 180 which would be overlaid with the contents of application volume 170.

Additionally, after the generation of delta volume 180 for the updated version of the application, other users may use delta volume 180 in receiving the updated version of the application rather than downloading and installing the same update. Here, a user in virtual machine 121 is allocated the first version of the application via application volume 170. While being provided with the application, the user may request an update for the application. In some examples, the update may be identified within the application itself (e.g. the application may notify the user that an update is available), however, it should be understood that in some implementations, once an updated version of the application is made available via a delta volume, other users of the same application may be provided with a notification of a new version of the application available via an attachable delta volume. This notification may be supplied by the application attach service 150 which identifies the generation of the delta volume, or may be provided in any other similar manner to virtual machine 121.

Once the user selects the update, the delta volume may be identified within application storage, and the delta volume may be attached to virtual machine 121 to make the updated version of the application available on virtual machine 121. This attachment may include mounting delta volume 180 and overlaying the contents within the file structure for virtual machine 121, such that the second version of the application is executable via the contents of application volume 170 and delta volume 180.

Figure 5:
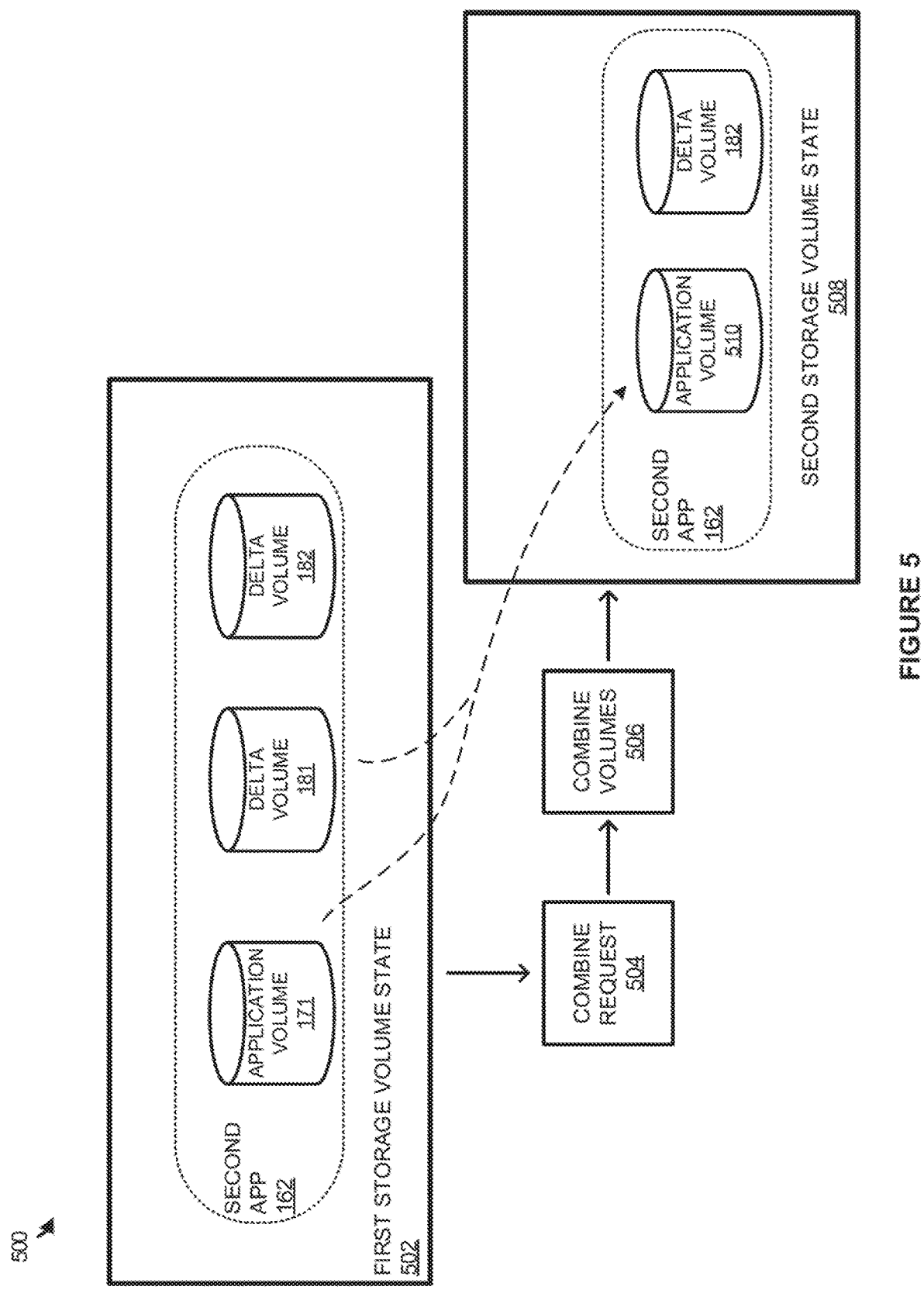
FIG. 5 illustrates an operational scenario of updating a base application volume according to an implementation.

FIG. 5 illustrates an operational scenario of updating a base application volume according to an implementation. Operational scenario 500 includes the volumes for second application 162 of FIG. 1 including application volume 171 and delta volumes 181-182, and further includes a new application volume 510.

Referring to first storage volume state 502, volumes may be stored in an application repository, such that the volumes may be attached to virtual machines to make second application 162 executable in the various versions. As depicted, in first storage volume state 502, an application may be capable of being executed in three versions, a first version represented by application volume 171, a second version represented by the combination of application volume 171 and delta volume 181, and a third version represented by the combination of application volume 171 and delta volumes 181-182. These secondary versions of the applications represented in delta volumes 181-182 may be generated by an administrator of the computing environment, or may be generated by a user of the computing environment. In particular, to generate the delta volumes, a user or administrator may select to update an application, and differencing data between the versions of the application may be placed in the delta volume. For example, when an update is requested for a third version of second application 162, delta volume 182 is generated that corresponds to differencing data of the third version of the application over the second version of the application provided by application volume 171 and delta volume 181.

Once multiple versions of the application are available via the base volume (application volume 171) and the delta volumes, an administrator may generate (504) a combine request. In particular, if an administrator of the computing environment would like to "phase out" or prevent future execution of a particular version of an application, one or more delta volumes may be integrated into the base application volume to generate a second base application volume. This integration may be used to remove versions of an application with a security flaw, ensure that users are using updated versions of an application, or removing application versions that are no longer in use. For example, if most users of the computing environment use the second and third versions of second application 162, then the administrator may desire to remove the first version of the application and mandate that users use one of the second or third versions of the application.

In response to the request, an action may be taken to combine (506) the appropriate volumes for the application. Here, the administrator desires to make the second version of the application the base version of the application to generate second storage volume state 508. To provide this functionality, the administrator may be provided with an interface, at the application attach service or some administrative device, capable of interacting with and managing the volumes in application volume storage. Once a selection is identified from the administrator, the differencing data stored in delta volume 181 may be applied to application volume 171 to generate application volume 510. Thus, the base version of the application comprises the second version of the application, while the third version of the application remains via delta volume 182 in combination with application volume 510.

In at least some implementations, in combining volumes for an application, the administrator may also manage user profiles to ensure that any user associated with the now defunct application version are associated with a newer version of the application. This may also include providing the users with a notification that they are now using a newer version of the application, and possible alternative versions for the application.

Figure 6:
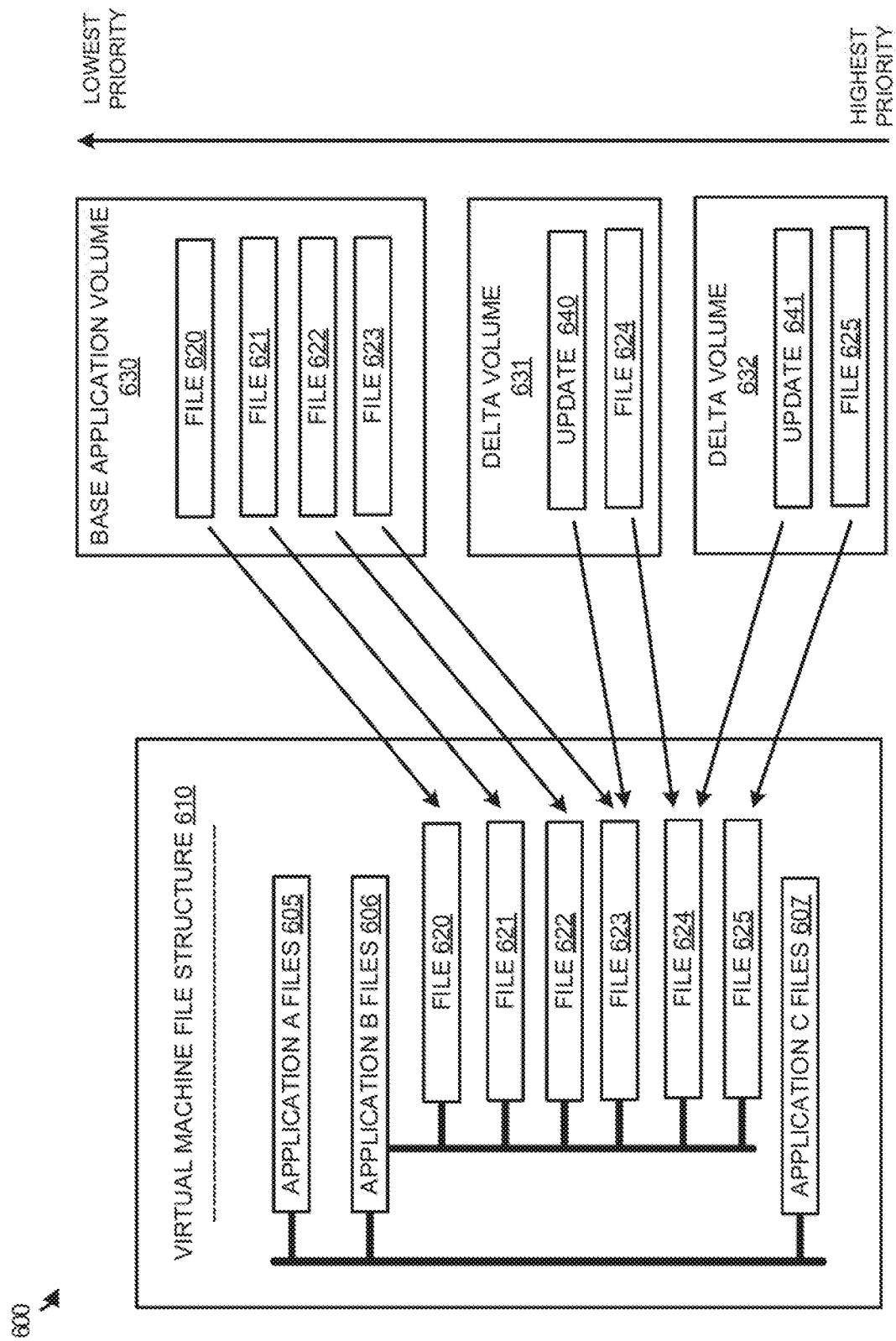
FIG. 6 illustrates a file structure overview for attaching application volumes according to an implementation.

FIG. 6 illustrates a file structure overview 600 for attaching application volumes according to an implementation. File structure overview 600 includes virtual machine file structure 610 with application A files 605, application B files 606, and application C files 607. Application B files 606 are representative of files that are overlaid from attachable application volumes to provide application B. File structure 600 further includes base application volume 630 with files 620-623, delta volume 631 with update 640 and file 624, and delta volume 632 with update 641 and file 625.

In operation, users of a virtual computing environment may be allocated applications to provide various operations. To provide the applications, the computing environment may attach volumes that include files, libraries, and registry keys that support the execution of the application. Here, a user is associated with a third version of an application, which is executable via base application volume 630 (associated with a first version of an application), delta volume 631 (associated with a second version of the application), and delta volume 632 (associated with the third version of the application). As depicted, because the user is associated with the third version of the application, the elements within delta volume 632 are prioritized over the contents of base application volume 630 and delta volume 631. Additionally, the contents of delta volume 631 are prioritized over base application volume 630. As a result of the configuration, newer object versions, such as files and file modifications are prioritized over previous versions. Although not illustrated in the present implementation, it should be understood that the delta volumes may also be used to remove obsolete files from previous versions. For example, if file 620 were not used by the third version of the application, then delta volume 632 may include data that removes the file from virtual machine file structure 610.

FIG. 7 illustrates a data structure 700 for managing application versions according to an implementation. Data structure 700 includes columns for applications 612 and users 710-712. Although illustrated as a single table in the present implementation, it should be understood one or more data trees, arrays, linked lists, and the like may be used in managing the application versions for end users of a computing environment. Data structure 700 is an example data structure for managing applications for end user by application attach service 150 of FIG. 1.

As depicted, each user of users 710-712 is associated with a column, wherein the column includes information about the application versions available to the user. These application versions and available applications may be selected by the user, or in some examples may be assigned to the user by an administrator of the computing environment. When a user requests a virtual machine, the application attach service may identify the applications of applications 720-723 associated with the particular user, and provide the appropriate version of the application to the virtual machine allocated to the user using the methods described herein. In particular, the application attach service may initiate an attach process for application volumes corresponding to the application versions, wherein the application volumes may be mounted to the virtual machine and the contents overlaid to make the application version executable in the virtual machine.

In some implementations, data structure 700 may be updated as different versions of an application are selected by a user, or an administrator allocates different versions of the applications to a user. For example, user 711 may be initially provided with version A of application 720, however, during a virtual computing session the user may select to update the application to version B. Consequently, data structure 700 may be updated to reflect the versions associated with the user, such that when the user requires a new session the appropriate version of the application may be provided to the user.

Figure 8:
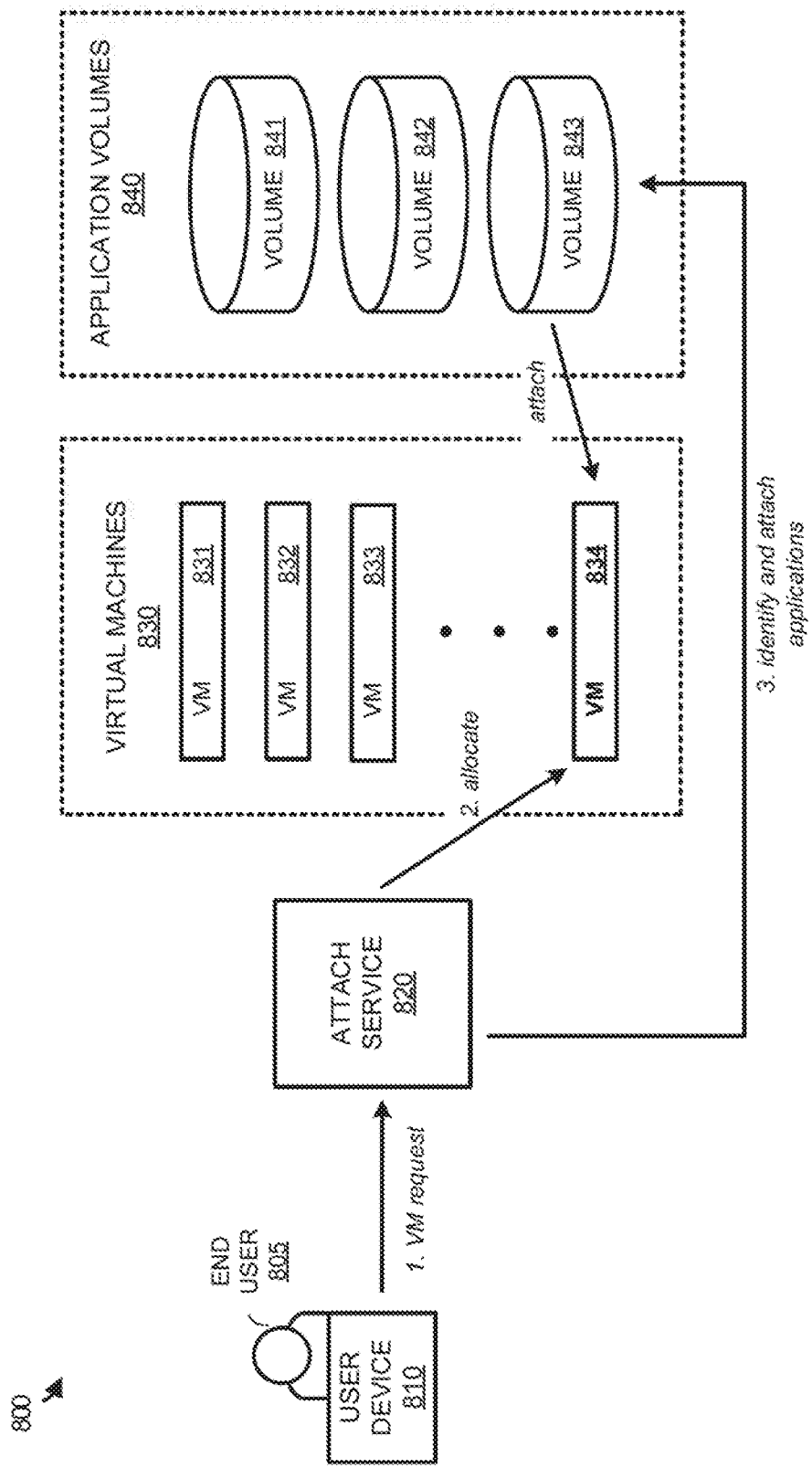
FIG. 8 illustrates an operational scenario of attaching an application volume according to an implementation.

FIG. 8 illustrates an operational scenario 800 of attaching an application volume according to an implementation. Operational scenario 800 includes user device 810, attach service 820, virtual machines 830 with virtual machines (VMs) 831-834, and application volumes 840 with volumes 841-843.

In operation, end user 805 at user device 810 may request, at step 1, a virtual session via attach service 820. In response to the request, attach service 820 may identify and allocate, at step 2, a virtual machine to support the virtual session, in this example virtual machine 834, and provide connectivity information to end user device 810 to permit a remote connection with virtual machine 834. This connectivity information may include addressing information, credential information, and the like to remotely connect to the virtual machine. In some implementations, virtual machine 834 may comprise an idle virtual machine in virtual machines 830, however, it should be understood that a new virtual machine may be initiated in some implementations.

In addition to allocating a user with a virtual machine, attach service 820 further identifies and attaches, at step 3, application volumes associated with end user 805. In particular, attach service 820 may manage user profiles for users of the computing environment, such that applications are attached to virtual machines when the user requests a virtual machine. Here, the applications that are identified for the user include version information such that volumes may be attached to the virtual machines corresponding to a particular version. In particular, although volume 843 is attached to provide end user 805 with a required application version, it should be understood that one or more delta volumes may be attached to virtual machine 834 to support a different version of the application.

In some implementations, the remote connection between the virtual machine and the end user device 810 can be implemented using a desktop remoting technology, such as Remote Desktop Services (RDS), Virtual Desktop Infrastructure (VDI), Desktop-as-a-Service (DAAS) or the like. Using such desktop remoting technologies, a user can be allowed to access a virtual desktop or application executing on a virtual machine over a remote network connection, such as a WAN connection. The virtual machine is hosted on a server that is physically located in a data center remotely located with respect to the end user device. When the device is used to access the virtual machine, the virtual machine (and associated applications) execution takes place on the remote host server which is linked to the end user device over a network, using a remote display protocol such as remote desktop protocol (RDP), PC-over-IP (PCoIP), Blast, virtual network computing (VNC), or the like. Using such a remote desktop protocol, the user can interact with the virtual machine hosted on the remote host server, such that only the display, keyboard, and mouse information is communicated with the end user device.

When the end user device is accessing the virtual machine using a remote desktop protocol, the graphical user interface (GUI) of the desktop is generated on the server hosting the virtual machine and the GUI image data is then encoded and transmitted over the network to the client device, where it is decoded and displayed to the user. For example, the framebuffer pixel data produced by the virtual machine may be encoded using a codec, such as H264, and transmitted over an Internet connection to the end user device, where the data is decoded and rendered in a window displayed on the screen of the end user device. Any user input information, such as keyboard and mouse events detected over the secure browser window on the end user device, are transmitted from the device to the virtual machine over the network connection, where it may in turn cause various updates thereon. In this manner, the user is able to view the GUI of the virtual machine and interact with it as if the virtual machine was actually running on the local end user device.

Figure 9:
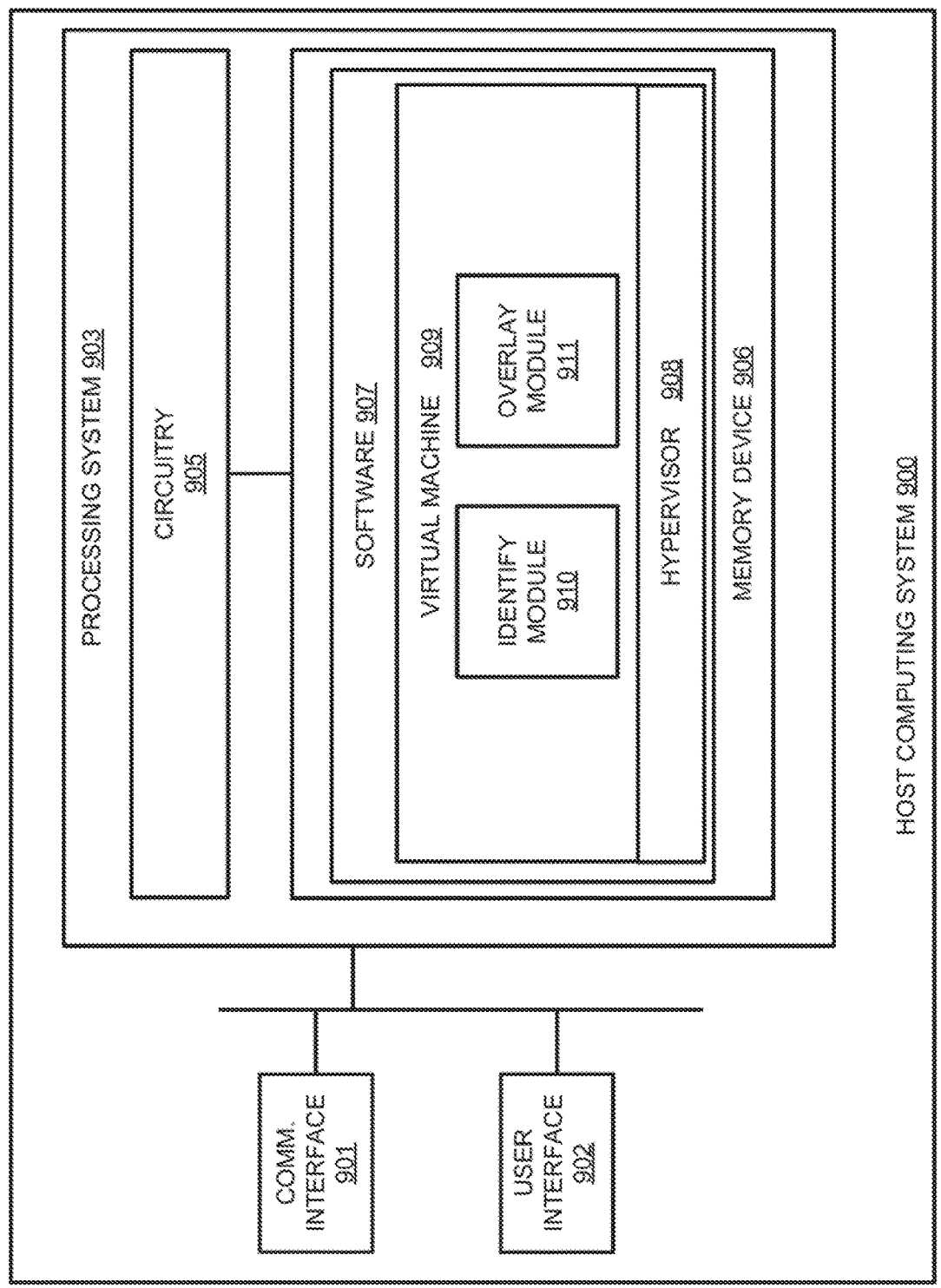
FIG. 9 illustrates a host computing system according to an implementation.

FIG. 9 illustrates a host computing system 900 for at least one virtual machine according to an implementation. Computing system 900 is representative of any computing system or systems with which the various operational architectures, processes, scenarios, and sequences disclosed herein for a host computing system may be implemented. Computing system 900 is an example host described in FIGS. 1-8, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity. Computing system 900 may comprise a serving computing system, a desktop computing system, or some other type of computing system.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In some implementations, communication interface 901 may be configured to communicate with an application attach service that manages the attachment of applications to virtual machines. In some examples, communication interface 901 may be configured to communicate with one or more storage systems or computing devices that serve as a repository for the application storage volumes.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some implementations.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes hypervisor 908, which provides a platform for virtual machine 909 and software modules 910-911, although any number of software modules may provide similar operations. Operating software 907 may further include an operating system, utilities, drivers, network interfaces, applications, or some other type of software. When executed by processing circuitry 905, operating software 907 directs processing system 903 to operate computing system 900 as described herein.

In at least one implementation, one or more application volumes may be attached to virtual machine 909 to make applications stored thereon available to the virtual machine. While attached, identify module 910 directs processing system 903 to identify a request to update an application. In response to the request, identify module 910 may transfer a notification of the request to an application attach service, wherein the application attach service may identify application storage volumes to support the update request, and initiate an attach operation to attach the application storage volumes to virtual machine 909. This attach operation may include mounting the application storage volumes to virtual machine 909 via hypervisor 908, and, using overlay module 911, overlay the contents of the volume into a file structure of the virtual machine to make the updated version of the application executable on the virtual machine.

Although the example provided above included an example of attaching applications storage volumes to a virtual machine to update an application, it should be understood that similar operations may be used to downgrade an application. Thus, rather than attaching storage volumes, which comprise delta volumes, to support an application update, one or more storage volumes may be detached from the virtual machine to make a downgraded version of an application executable.

Further, while demonstrated in the example provided above as attaching volumes to support an update, it should be understood that the virtual machine, in some examples in combination with the application attach service, may be used to provision a new volume to support an application update that is not currently available via an attachable application volume. For example, in response to a request for a version of the application not currently available via delta volumes, a new delta volume may be generated that stores differencing data (files, modifications, and the like) for the new version over a version available via storage volumes of the computing environment. In generating the volume, virtual machine 909 may download an update file (often in compressed form), extract the data from the update and write the delta or differencing data for the update to the newly generated delta volume.

Figure 10:
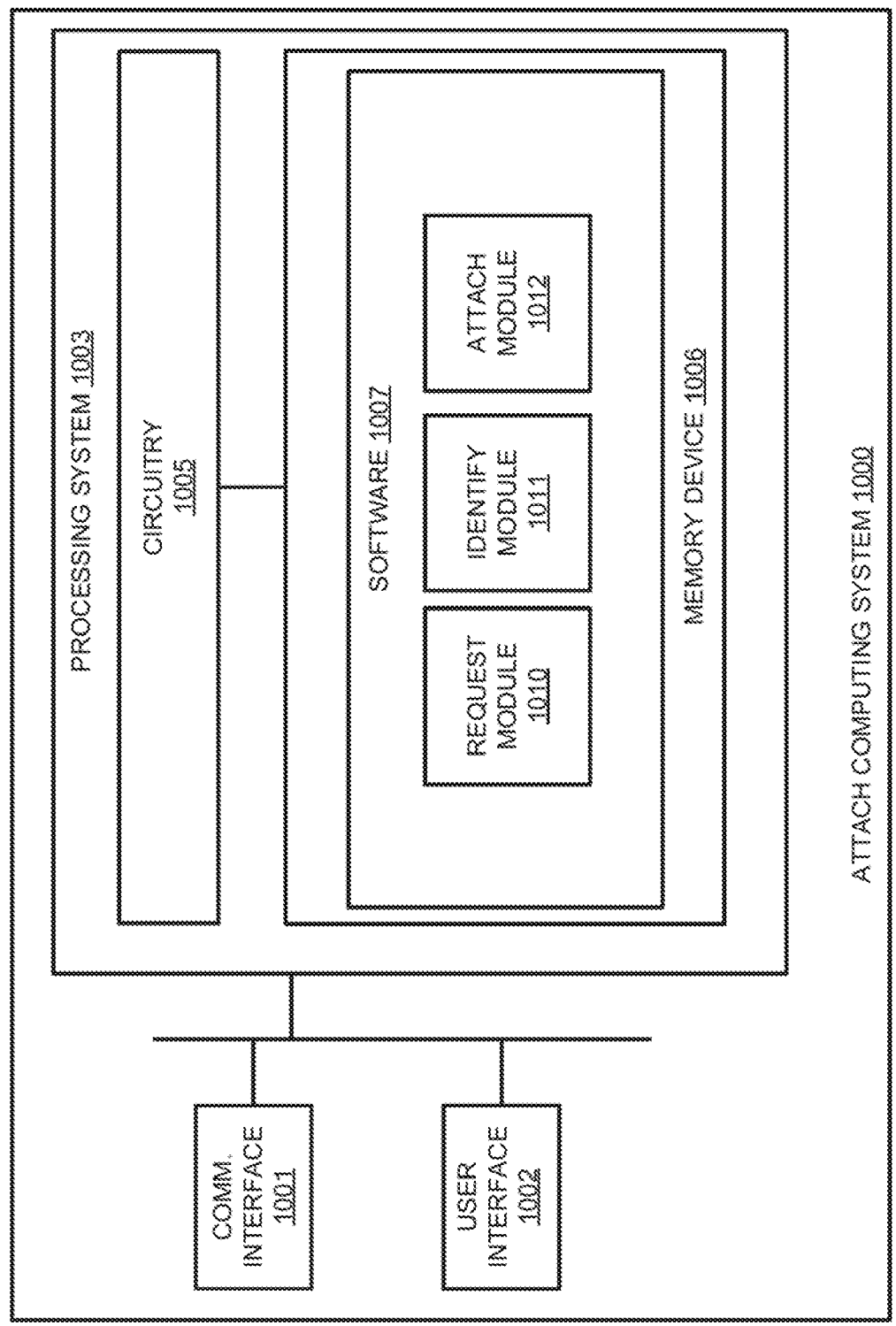
FIG. 10 illustrates an attach computing system according to an implementation.

FIG. 10 illustrates an attach service computing system 1000 according to an implementation. Computing system 1000 is representative of any computing system or systems with which the various operational architectures, processes, scenarios, and sequences disclosed herein for an application attach service may be implemented. Computing system 1000 is an example of the application attach services described in FIGS. 1-8, although other examples may exist. Computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Computing system 1000 may include other well-known components such as a battery and enclosure that are not shown for clarity.

Communication interface 1001 comprises components that communicate over communication links, such as network cards, ports, radio frequency (RF), processing circuitry and software, or some other communication devices. Communication interface 1001 may be configured to communicate over metallic, wireless, or optical links. Communication interface 1001 may be configured to use Time Division Multiplex (TDM), Internet Protocol (IP), Ethernet, optical networking, wireless protocols, communication signaling, or some other communication format—including combinations thereof. In some implementations, communication interface 1001 may be configured to communicate with one or more host computing systems for virtual machines capable of attaching applications. In some examples, communication interface 1001 may be configured to communicate with one or more storage systems or computing devices that serve as a repository for the application storage volumes. In some implementations, communication interface 1001 may further be configured to receive and allocate requests from end user devices to virtual machines in a computing environment.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some implementations.

Processing circuitry 1005 comprises microprocessor and other circuitry that retrieves and executes operating software 1007 from memory device 1006. Memory device 1006 may include volatile and nonvolatile, removable and non-removable media implemented in any method or technology for storage of information, such as computer readable instructions, data structures, program modules, or other data. Memory device 1006 may be implemented as a single storage device, but may also be implemented across multiple storage devices or sub-systems. Memory device 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1005 is typically mounted on a circuit board that may also hold memory device 1006 and portions of communication interface 1001 and user interface 1002. Operating software 1007 comprises computer programs, firmware, or some other form of machine-readable program instructions. Operating software 1007 includes request module 1010, identify module 1011, and attach module 1012, although any number of software modules may provide similar operations. Operating software 1007 may further include an operating system, utilities, drivers, network interfaces, applications, or some other type of software. When executed by processing circuitry 1005, operating software 1007 directs processing system 1003 to operate computing system 1000 as described herein.

In at least one example, request module 1010 directs processing system 1003 to identify a request to update an application from a first version to a second version, wherein the first version of the application is executable on the virtual machine via one or more storage volumes attached to the virtual machine. For example, request module 1010 may be used to receive a request from a virtual machine to update a version of an application on the virtual machine. In response to the request, identify module 1011 directs processing system 1003 to identify one or more additional storage volumes associated with the second version of the application, wherein the one or more additional storage volumes comprise one or more delta volumes for the second version of the application over the first version of the application. Once identified, attach module 1012 directs processing system 1003 to attach the one or more additional storage volumes to the virtual machine to make the second version of the application executable on the virtual machine via the one or more storage volumes and the one or more additional storage volumes.

Although demonstrated in the previous example as updating an application using delta volumes, it should be understood that similar operations may be used to identify delta volumes for detachment to downgrade an application from one version to another. Moreover, in some implementations, the software modules may further be used in identifying that a delta volume does not currently support a new version of an application and initiate the generation of the delta volume to support the new version. Once generated, the volume may be attached and overlaid in a file structure for a requesting virtual machine to make the new version executable along with one or more other storage volumes that provided a previous version of the application.

FIG. 11 illustrates an architecture 1100 of a virtual environment according to an implementation. Architecture 1100 includes attach service 1110, virtual machine 1120, and application storage 1130. Attach service 1110 further includes version control manager 1112 with composer 1114 and inventory 1116, and virtual machine 1120 further includes version control agent 1122 with detector 1124, capture 1126, and user interface element 1128. Application storage 1130 includes a plurality of virtual volumes (not shown) that correspond to base application volumes, as well as delta volumes that provide updates to the base applications. Although demonstrated in the example of FIG. 11 with a single virtual machine, it should be understood that the virtual machine may include additional virtual machines.

Version control agent 1122 runs as a service on the virtual machine and is used to manage the application versions available to the virtual machine. In particular, detector 1124 is used to distinguish between native applications of the virtual machine and attached applications made available via storage volumes in application storage 1130. In providing this service, detector 1124 may identify when an update is requested in the virtual machine for an application that is attached via application storage 1130 and either initiate a capture of the update in a delta volume (when no update is available for the application in application storage 1130), or provide an update suggestion using available application versions from application storage 1130. To provide the update suggestions to a user, user interface element 1128 may be initiated when a user requests an update of an attached application. Once initiated, user interface element 1128 may provide a menu, wherein the menu permits the user to select a version of the application made available via volumes in application storage 1130, or select an option to obtain a new version of the application from a secondary source often in compressed form (e.g. a file from the internet). If a version is selected from the available volumes, volumes may be attached, or in some examples detached, to provide the requested application version. In contrast, if a new version of the application is obtained from a secondary source, capture 1126 may be used to extract the update from the update file and store the delta data from the update in a delta volume of application storage 1130. Once stored in the delta volume, the updated application may be executed using the newly created delta volume and one or more other volumes that were previously attached to virtual machine 1120.

To provide the various application versions to virtual machine 1120, version control manager 1112 of attach service 1110 is provided. Within version control manager 1112, composer 1114 creates a chain of delta volumes which carries the delta bits for different versions of an application. In particular, composer 1114 may be responsible for identifying a base volume for an application, and managing the corresponding delta volumes for that application. This may include identifying and associating a first version of an application with the base volume, associating a second version of the application with the base volume and at least one other delta volume, and so forth. This associating of application versions to their corresponding disks may be based, at least in part, on information from version control agent 1122, which may indicate when a new delta volume is being generated for a new version of an application. Further, composer 1114 may be used to provide information to other the virtual machines of the computing environment to indicate the current application versions that are supported via attachable volumes in application storage 1130.

In addition to the operations of composer 1114, inventory 1116 is used to associate users of the computing environment with their corresponding application versions. For example, a first user of the virtual environment may have a profile in inventory 1116 that requests a first version of the application be provided when they log into a virtual machine, whereas a second user of the virtual environment may have a profile in inventory 1116 that requests a second version of the application be provided when they log into a virtual machine. However, the profiles of the users may be dynamic as the users request and receive different versions of the application. Thus, when the first user requests and update from the first version of the application to the second version of the application, the profile of the user may be updated to reflect this preference. Moreover, if an administrator selects to combine one or more volumes to eliminate the availability of a version of an application, profiles associated with the eliminated version of the application may be updated to a different version of the application.

Returning to the elements of FIG. 1, application attach service 150 may comprise communication interfaces, network interfaces, processing systems, computer systems, microprocessors, storage systems, storage media, or some other processing devices or software systems, and can be distributed among multiple devices. Examples of application attach service 150 can include software such as an operating system, logs, databases, utilities, drivers, natural language processing software, networking software, and other software stored on a computer-readable medium. Application attach service 150 may comprise, in some examples, one or more server computing systems, desktop computing systems, laptop computing systems, or any other computing system, including combinations thereof.

Host 110 comprises communication interfaces, network interfaces, processing systems, computer systems, microprocessors, storage systems, storage media, or some other processing devices or software systems, and can be distributed among multiple devices. Host 110 can include software such as an operating system, logs, databases, utilities, drivers, natural language processing software, networking software, and other software stored on a computer-readable medium. Host 110 may comprise a serving computing system, a desktop computing system, or some other similar computing system.

Application storage 160 may reside on any computing system or systems that can include communication interfaces, network interfaces, processing systems, computer systems, microprocessors, storage systems, storage media, or some other processing devices or software systems, and can be distributed among multiple devices. Application storage 160 may be located on one or more server computing systems, desktop computing systems, laptop computing systems, or any other computing system, including combinations thereof. Although illustrated separate from host 110, it should be understood that application storage 160 may be stored locally on host 110 in some implementations.

Communication between application attach service 150, host 110, and application storage 160 may use metal, glass, optical, air, space, or some other material as the transport media. Communication between application attach service 150, hosts 110-111, and application storage 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between application attach service 150, hosts 110-111, and application storage 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of updating an application on a virtual machine, the method comprising:
   identifying a request to update an application from a first version to a second version, wherein the first version of the application is executable on the virtual machine via one or more storage volumes attached to the virtual machine;

in response to the request, identifying one or more additional storage volumes associated with the second version of the application, wherein the one or more additional storage volumes comprise one or more delta volumes for the second version of the application over the first version of the application; and attaching the one or more additional storage volumes to the virtual machine to make the second version of the application executable on the virtual machine using data from the one or more storage volumes and the one or more additional storage volumes.

2. The method of claim 1, wherein the one or more storage volumes and the one or more additional storage volumes comprise virtual disks.

3. The method of claim 1 further comprising:
identifying a second request to downgrade the application from the second version to the first version;
in response to the second request, identifying the one or more additional storage volumes associated with the second version of the application; and
detaching the one or more additional storage volumes from the virtual machine.

4. The method of claim 1 further comprising attaching the one or more storage volumes to the virtual machine, wherein attaching the one or more storage volumes comprises mounting the one or more storage volumes to the virtual machine and overlaying contents of the one or more storage volumes in a file structure for the virtual machine.

5. The method of claim 4, wherein attaching the one or more additional storage volumes to the virtual machine comprises mounting the one or more additional storage volumes to the virtual machine and overlaying contents of the one or more additional storage volumes in the file structure for the virtual machine.

6. The method of claim 5, wherein overlaying the contents of the one or more additional storage volumes comprise prioritizing the contents of the one or more additional storage volumes over the contents of the one or more storage volumes.

7. The method of claim 6, wherein the contents of the one or more storage volumes and the contents of the one or more additional storage volumes comprise files and registry keys.

8. The method of claim 1 further comprising:
in response to identifying the request, determining whether the second version of the application is available via one or more additional storage volumes;
if the second version is available:
identifying the one or more additional storage volumes associated with the second version of the application; and
attaching the one or more additional storage volumes to the virtual machine to make the application executable on the virtual machine via the one or more storage volumes and the one or more additional storage volumes; and
if the second version is unavailable:
generating a new storage volume with differencing data for the second version of the application over the first version of the application.

9. A computer apparatus comprising:
one or more non-transitory computer readable storage media;
a processing system operatively coupled to the one or more non-transitory computer readable storage media; and
program instructions stored on the one or more non-transitory computer readable storage media to update an application on a virtual machine that, when read and executed by the processing system, direct the processing system to:
identify a request to update an application from a first version to a second version, wherein the first version of the application is executable on the virtual machine via one or more storage volumes attached to the virtual machine;
in response to the request, identify one or more additional storage volumes associated with the second version of the application, wherein the one or more additional storage volumes comprise one or more delta volumes for the second version of the application over the first version of the application; and
attach the one or more additional storage volumes to the virtual machine to make the second version of the application executable on the virtual machine via using data from the one or more storage volumes and the one or more additional storage volumes.

10. The computing apparatus of claim 9, wherein the one or more storage volumes and the one or more additional storage volumes comprise virtual disks.

11. The computing apparatus of claim 9, wherein the program instructions further direct the processing system to:
identify a second request to downgrade the application from the second version to a third version;
in response to the second request, identify a subset of storage volumes from the one or more storage volumes and the one or more additional storage volumes that support the second version of the application over the third version of the application; and
detach the subset of storage volumes from the virtual machine.

12. The computing apparatus of claim 9, wherein the program instructions further direct the processing system to attach the one or more storage volumes to the virtual machine, wherein attaching the one or more storage volumes comprises mounting the one or more storage volumes to the virtual machine and overlaying contents of the one or more storage volumes in a file structure for the virtual machine.

13. The computing apparatus of claim 12, wherein attaching the one or more additional storage volumes to the virtual machine comprises mounting the one or more additional storage volumes to the virtual machine and overlaying contents of the one or more additional storage volumes in the file structure of the virtual machine.

14. The computing apparatus of claim 13, wherein overlaying the contents of the one or more additional storage volumes comprise prioritizing the contents of the one or more additional storage volumes over the contents of the one or more storage volumes.

15. The computing apparatus of claim 14, wherein the contents of the one or more storage volumes and the one or more additional storage volumes comprise files and registry keys.

16. The computing apparatus of claim 9, wherein the program instructions further direct the processing system to:
in response to identifying the request, determine whether the second version of the application is available via one or more additional storage volumes;

if the second version is available:
  identify the one or more additional storage volumes associated with the second version of the application; and
  attaching the one or more additional storage volumes to the virtual machine to make the application executable on the virtual machine via the one or more storage volumes and the one or more additional storage volumes; and
if the second version is unavailable:
  generate a new storage volume with differencing data for the second version of the application over the first version of the application.

17. A method of downgrading an application on a virtual machine, the method comprising:
  identifying a request to downgrade an application from a first version to a second version, wherein the first version of the application is executable on the virtual machine using data from a plurality of storage volumes attached to the virtual machine;
  in response to the request, identifying a subset of the plurality of storage volumes that support the first version of the application over the second version of the application; and
  detach the subset of the plurality of storage volumes from the virtual machine to make the second version of the application executable on the virtual machine from one or more remaining storage volumes of the plurality of storage volumes attached after the detachment of the subset.

18. The method of claim 17, wherein the subset of the plurality of storage volumes comprise delta volumes.

19. The method of claim 17, wherein the plurality of storage volumes comprise virtual disks.

20. The method of claim 17 further comprising:
  attaching the plurality of storage volumes to the virtual machine, wherein attaching the plurality of storage volumes to the virtual machine comprises mounting the plurality of storage volumes to the virtual machine and overlaying contents of the plurality of storage volumes in a file structure for the virtual machine.

* * * * *

UNITED STATES PATENT AND TRADEMARK OFFICE
CERTIFICATE OF CORRECTION

PATENT NO. : 10,827,034 B2
APPLICATION NO. : 15/700078
DATED : November 3, 2020
INVENTOR(S) : Sivaprasad Kundoor Govindankutty et al.

It is certified that error appears in the above-identified patent and that said Letters Patent is hereby corrected as shown below:

In the Claims

Column 18, Claim 9, Line 22, delete "via"

Signed and Sealed this
Thirty-first Day of May, 2022

Katherine Kelly Vidal
*Director of the United States Patent and Trademark Office*